Sept. 12, 1961 H. STIERLIN 2,999,373
GENERATOR ASSEMBLY FOR ABSORPTION REFRIGERATING
SYSTEM OF THE PRESSURE-EQUALIZED GAS TYPE
Filed Jan. 30, 1959 2 Sheets-Sheet 1

INVENTOR
HANS STIERLIN
BY
ATTORNEY

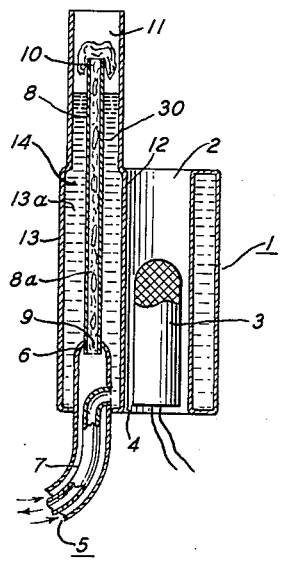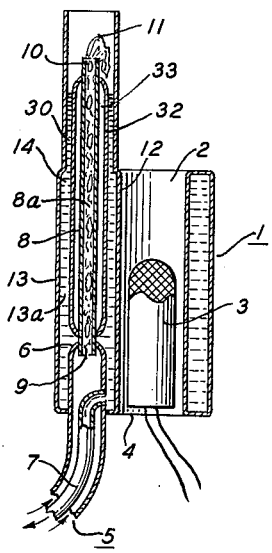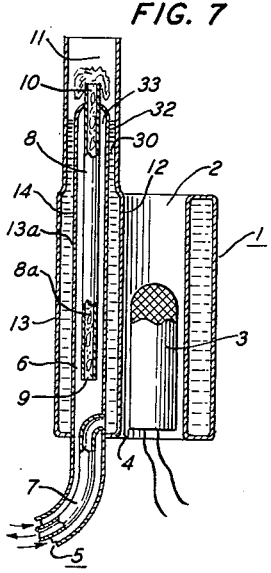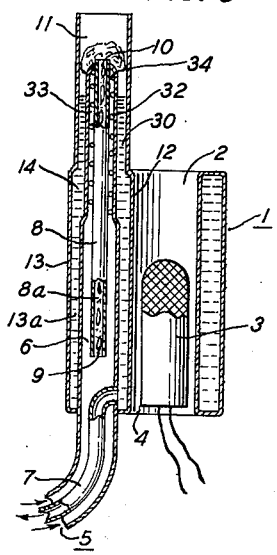

United States Patent Office

2,999,373
Patented Sept. 12, 1961

2,999,373
GENERATOR ASSEMBLY FOR ABSORPTION REFRIGERATING SYSTEM OF THE PRESSURE-EQUALIZED GAS TYPE
Hans Stierlin, Rainweg 15, Schlieren-Zurich, Switzerland
Filed Jan. 30, 1959, Ser. No. 790,187
Claims priority, application Switzerland Feb. 12, 1958
9 Claims. (Cl. 62—497)

The instant invention relates to an absorption refrigerating system with pressure-equalizing gas, and more particularly to the generator, the thermosiphonic pump and the vapor rectifier path thereof, the thermosiphonic pump being disposed within the boiler or generator and the rectifier.

An object of the invention is to prevent excessive temperatures of the vapor-liquid mixture in the pump or riser tube of an absorption refrigerating system which adversely affect rectification of the vapor as also the flow and counter-flow of the gaseous and liquefied refrigerant in the system.

Another object of the invention is to assure optimum rectification by avoiding all secondary turbulent or convection flow in the rectifier-generator passage and to prevent, to the greatest extent possible, heat conduction through the passage walls of the rectifier path.

Another object is to provide a generator-pump construction for absorption refrigeration systems of which the operation is optimum, even on starting, operation at partial load, or in thermostatically controlled operation, by preventing partial condensation in the pump or riser tube.

I accomplish the foregoing, and other, objects in a pressure-equalized gas absorption refrigerating system by heat isolating the interior of the riser tube from the exterior surrounding space about its entire surface and at least substantially its length to prevent further, and excessively high, generation of the refrigerant gas in the pump tube.

The state of the prior art and illustrative embodiments of my instant invention will now be explained in detail with the aid of the appended drawing, in which:

FIGS. 5 through 8 are differing illustrative embodiments of the generator elements, of my instant invention, respectively.

Figure 1:
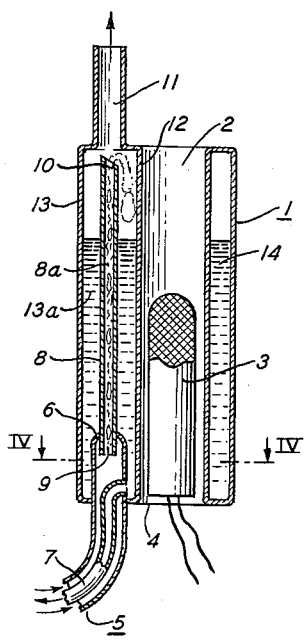
FIG. 1 is a prior art generator for absorption refrigerating systems in which the thermosiphonic pump is disposed within the boiler or generator.
Figure 4:
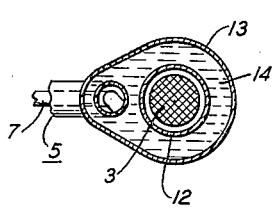
FIG. 4 is a section along IV—IV of each generator of FIGS. 1 to 3.

The prior known structure of FIG. 1 shows a boiler or generator 1 in the form of a hollow cylinder with an eccentrically disposed hollow core 2 therethrough, the hollow core constituting the region within which electric heating element 3 is disposed, although heating may obviously be by a gas, or other, burner. The end of a liquid-counterflow heat exchanger 5 extends into bottom 4 of the generator, such end forming a dome 6, while the inner tube 7 of the heat exchanger opens into the generator interior. At the top central portion of the dome, there is disposed a pump or riser tube 8, having an interior region 8a, of which its lower end 9 opens and extends into the interior of dome 6. The upper end 10 of the riser tube extends into the outflow region 11 of the generator. Cylindrical wall 12 of the inner core 2 is designated the heater tube, outer cylindrical wall 13 (see also FIG. 4) the generator jacket, and the space 13a therebetween the outer region of the generator. It is to be understood, of course, that the pressure-equalized gas absorption refrigerators herein discussed, including those incorporating the instant invention, are closed systems of which only those parts essential to an understanding of the invention are shown in the drawing and discussed in the specification.

The mode of operation of the generator is as follows: An aqueous solution enriched with ammonia flows from heat exchanger 5 into dome 6 and interior region 8a of pump tube 8. Within the dome, the solution is indirectly heated by electric heating element 3 by way of liquid 14 within generator 1, which liquid 14 is likewise an ammonia solution, of weaker concentration, however, having been boiled out, than that flowing into dome 6 and pump tube 8. Hence, it has a higher boiling point, and a correspondingly higher temperature, than the solution in dome 6. The solution heated in the dome and within the lower end of the pump tube forms gas bubbles and just as soon as the dome 6 is filled with gas, bubbles will rise in the pump tube. When a bubble has entered the pump tube, liquid will push it upward in tube 8. The bubble next entering the pump tube pushes such liquid cylinder ahead of it, as the result of which the desired thermosiphonic pumping action occurs. After the bubble of gas has left pump tube 8, it flows upwardly through generator outflow passage 11, while the pumped liquid which has now become weaker in its ammonia content, flows downwardly into the generator where it's further boiled-out and thus releases ammonia bubbles rich in their water vapor content which rise upwardly through the successively cooler layers of liquid in which the steam mixture is rectified. The bubbles rising in the outflow 11 are thus ammonia gas which are already enriched. The layers weakest in ammonia content flow off through the middle tube 7 and, in their counterflow, heat the liquid mass flowing in outer tube 5 toward the dome.

In this simple arrangement in which pump tube 8—also designated the riser tube—passes through the above mentioned hot generator liquid, there is the very marked disadvantage that the pump mixture of vapor and liquid will have transmitted to it through the walls of the pump tube appreciable additional amounts of heat from the hotter generator liquid, and as a result increase the temperature beyond what is desirable so that rectification immediately following upon the completion of the pumping of the vapor rising from the generator, which should be at the lowest possible temperature, is adversely affected. Furthermore, such rectification is defective in respect of favorable flow guidance between vapor and liquid.

Figure 2:
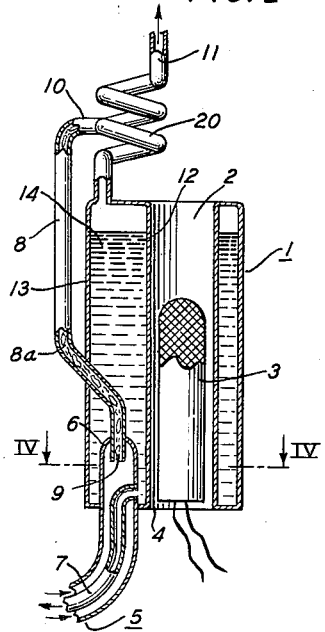
FIG. 2 is a further prior art generator type of which the pump or riser tube is mainly outside the generator per se and is connected to a coiled rectification region.
Figure 3:
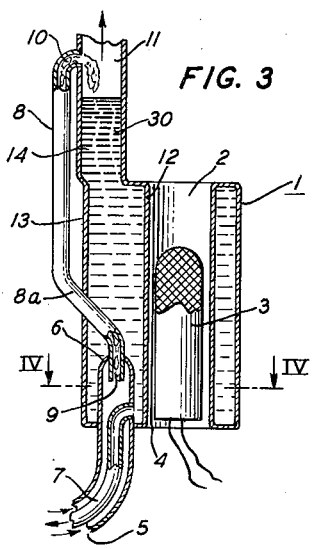
FIG. 3 is a further prior art generator of the type of FIG. 2 with, however, a cylindrical rectification region in the form of a continuation of the generator.

The prior art generator structure shown in FIG. 2 does eliminate the disadvantages of the FIG. 1 arrangement by having the pump tube 8 pass to the exterior of the generator thus eliminating a considerable amount of heat conduction to the pump tube, as also by providing proper counterflow of the rising vapors from the generator and of the down-flowing liquid by way of coil 20 into which the pump tube merges at the upper end region of the coil. Likewise, by proper dimensioning of the rectification passage 30 of the prior art arrangement of FIG. 3, in which the structure is simplified and of a lesser required height, good rectification can be obtaind and, to the greater extent, below the liquid level. In such arrangement, the quality of the rectification depends to a large measure on the requirement that the mutually penetrating down and up flows take the form of as substantially as possible parallel flows over the entire cross-section of the passage and remain without any secondary turbulent or convection flows. Nevertheless, all heat transfer through the passage walls along the rectification path should be kept to a minimum.

Both these structures (FIGS. 2 and 3) do not have the disadvantages of the FIG. 1 arrangement. However, they do have the disadvantage that, particularly when operating at partial load but also when starting or where operation is thermostatically controlled, that partial condensation can occur in the portion of the pump tube 8 external to the generator, even though such portion is thermally isolated from the generator, by external cooling thereof, thereby adversely affecting operation of the assembly.

Generator assemblies for absorption refrigerating systems in which the thermosiphonic pump tube is likewise disposed within the generator but which are heated directly by a central heater tube, are also prior known. In such structures it has been suggested that the thermosiphonic pump, in the form of a coil wrapped around the heater tube, be externally jacketed by a heat insulating covering in order to eliminate or reduce to a minimum any undesired heat transfer to the liquid content of the generator which externally surrounds the thermosiphonic pump.

In the embodiments of the instant invention, on the contrary, heating of the contents of the pump takes place in the dome positioned below the pump per se, and by way of the hotter generator liquid surrounding the dome which generator liquid in turn is heated by the heater element directly by means of the heater tube. Additionally, the riser or pump tube per se is protected to the greatest possible extent from any other transfer of heat.

In FIG. 5, the generator portion of an absorption refrigeration system of a first embodiment of the invention is shown. The overall and general arrangement thereof is the same as in the prior art generators above discussed. The generator of the invention includes a hollow core 2 housing electric heating element 3, and a bottom 4 as also a liquid heat exchanger 5 opening into a lower region of the generator, the heat exchanger 5 being dome-shaped at its end 6, and having a central tube 7 opening within such region into the interior of the generator. A pump tube 8 is disposed centrally of the dome, on the axis thereof, and has its lower end 9 extending into the domed region. The upper end of pump tube 8 extends to the outflow 11 of the generator, which outflow 11 is connected to a cylindrical rectification passage 30 above the outflow. To prevent heat absorption and axial conduction of heat, the pump tube, in accordance with the invention, is made of a poor heat-conducting material, thus preventing both the unwanted transverse heat conduction from, for example, the hotter generator liquid 14 to the relatively cooler pumped liquid within the interior 8a of the pump tube, as also the conduction of heat along the pump tube wall which would adversely affect rectification.

The modified illustrative embodiment of the invention shown in FIG. 6 has improved heat insulation of the interior 8a of pump tube 8 relative to the surrounding hotter liquid 14 surrounding the tube. Directly extending from the dome 6, the pump tube is enveloped by a jacket 32 spaced from the tube and providing an insulating annular and cylindrical gap 33, of which jacket the upper and lower ends are sealed to the tube thus providing the closed region 33 which may either be evacuated or filled with gas. This form of heat isolation is better than that of the FIG. 5 embodiment.

Another solution is shown in the illustrative embodiment of FIG. 7 in which the dome-shaped end region of the heat exchanger 5 extends to substantially the upper end 10 of pump tube 8. The lengthy and elongated dome portion 6 will on filling the system, or when it has been in operation for a short time, fill up with vapor in so far as it is not already filled by the equalizing gas, so that the interior 8a of pump tube 8 is substantially completely isolated from the generator liquid 14.

The embodiments of the invention shown in FIGS. 5 through 7 not only have the advantage, as compared to the prior art structure shown in FIG. 1, that the pump tube is heat insulated, but, in addition, have a better rectification unit 30 which enables establishment and maintenance of parallel flow. Disturbance of the flow relations and hence, of excellent rectification, can be avoided in that the pump tube, inclusive of its heat insulation, extending internally through the whole of the rectification passage, is made of as small an outer diameter as possible. By decreasing the insulating region 33 to a just permissible minimum at least in the upper portion of the rectification passage, the favorable effect thereof can be furthered. On such recognition, the illustrative embodiment of FIG. 8 is based. The dome 6 is extended to about midway the height of the generator chamber 14 and then extended further upwardly within the rectification passage 30 in the form of a minimum width of the insulating annular cylinder 33 and minimum external dimensions of pump tube 8. In order to assure uniform width of such upper portion of the insulating cylinder 33, an open wire helix 34 is positioned between the outer cylindrical surface of tube 8, being wound thereon, and the inner cylindrical surface of the extension of the dome 6.

In all the illustrative embodiments of the invention, the mode of operation is the same. It will be noted that small wall thicknesses of tube 8 where it is of metal, and the poor heat conducting properties when the tube 8 is of non-metal, prevent conduction of heat in the axial direction of the tube.

Generators according to the instant invention have marked freedom from the disadvantages, above mentioned, of prior art generators in that both at partial and full load, as also on starting, they function with absolute precision and properly and with optimum efficiency in that they have extremely small total heating and heated surfaces and thus small heat losses. In addition, they are of relatively simple construction and operation, and hence inexpensive.

What I claim is:

1. A generator for gas-equalized refrigeration systems comprising a chamber having a first compartment at its lower region and a second compartment extending from the bottom to the top of the chamber and enveloping the first compartment, a heat exchanger of the counterflow type having coaxial inner and outer tubes, the outer tube containing liquid solution high in absorbed refrigerant and being connected to the bottom region of the first compartment, the inner tube of the heat exchanger containing liquid solution low in absorbed refrigerant and connected to the bottom region of the second compartment, a pump tube extending vertically through the second compartment with its lower end opening into the top region of the first compartment, heating means for directly heating the solution low in absorbed refrigerant within the second compartment, the heating means positioned remote from the pump tube, the heated solution low in absorbed refrigerant in turn heating the solution high in absorbed refrigerant within the first compartment to release refrigerant vapor from the latter solution, a rectifier tube connected to the upper end of the second compartment, the upper open end of the pump tube being above the level of the liquid solution in the second compartment, and means heat isolating the pump tube for at least a substantial portion of its length within the solution of the second compartment from such liquid solution within the second compartment.

2. The generator according to claim 1 in which the heat isolating means extends the entire length of the pump tube.

3. The generator according to claim 1 in which the heat isolating means is the insulating material of the pump tube.

4. The generator according to claim 1 in which the heat isolating means is a jacket sealed at its ends to the end regions of the pump tube and spaced from the tube at the region intermediate the ends and forming an evacuated chamber about the tube.

5. The generator according to claim 1 in which the heat isolating means is a jacket sealed at its ends to the end region of the pump tube and spaced from the tube at the region intermediate the ends, and a gas within the chamber so formed about the tube.

6. The generator according to claim 1 in which the heat isolating means is the outer passage of the tubular heat exchanger which concentrically extends the length of the pump tube and is sealed to the upper end region of the pump tube.

7. The generator according to claim 1 in which the pump tube extends into the rectifier tube and is concentric therewith.

8. The generator according to claim 6 in which the diameter of the outer passage of the heat exchanger extending the length of the pump tube is reduced in substantially the upper half region thereof.

9. The generator according to claim 8 in which an open spiral is wound about such upper half region of the tube and within the reduced diameter region of the outer passage extension.

References Cited in the file of this patent

UNITED STATES PATENTS

| | | |
|---|---|---|
| 1,791,441 | Bertsch | Feb. 3, 1931 |
| 2,337,653 | Ehnbohm | Dec. 28, 1943 |
| 2,399,922 | Grossman | May 7, 1946 |

FOREIGN PATENTS

| | | |
|---|---|---|
| 108,149 | Switzerland | Dec. 16, 1924 |
| 1,109,559 | France | Sept. 28, 1955 |